United States Patent Office 3,084,084
Patented Apr. 2, 1963

3,084,084
PROPELLANT GRAIN POLYMERIZATION PROCESS
Gaetano F. D'Alelio, South Bend, Ind., assignor, by direct and mesne assignments, to Dal Mon Research Co., Cleveland, Ohio, a corporation of Delaware
No Drawing. Filed July 12, 1960, Ser. No. 42,212
20 Claims. (Cl. 149—19)

This invention relates to a process for the polymerization of conjugated dienes. More particularly it relates to the polymerization of conjugated dienes catalyzed by alkali metals or their hydrocarbon derivatives, in the presence of solid oxidizing agents.

In polymerizing butadiene and other conjugated dienes with alkali metals, such as sodium, it is known that various materials, such as oxygen, oxygen generating compounds, acetylenes, etc., retard and inhibit such polymerizations. It is believed that these materials act as catalyst poisons and thereby prevent the alkali metal from catalyzing the polymerization.

In view of the oxygen generating properties of various perchlorates, nitrates, etc., it would be expected that the presence of substantial amounts of perchlorates, nitrates, and other solid oxidizing agents would inhibit and prevent alkali metals from catalyzing the polymerization of such conjugated dienes.

Most surprisingly, however, in accordance with the practice of this invention, it has been found that conjugated dienes, such as butadiene-1,3, isoprene, 2-ethyl-butadiene-1,3, 2-phenyl-butadiene-1,3, 2,3-dimethylbutadiene-1,3, pentadiene-1,3, cyclopentadiene, etc., advantageously having no more than about 12 carbon atoms therein, can be polymerized by an alkali metal or a hydrocarbon derivative of such a metal in the presence of 5-95 percent by weight of a solid oxidizing agent, such as the lithium, sodium, potassium, ammonium, calcium, cesium, and barium perchlorates, nitrates, chlorates, iodates, dichromates, etc. It also has been found that mass castings of considerable size, containing substantial proportions of the aforesaid oxidizing agents can be made in this manner, which are particularly useful as solid propellant fuel grains for rockets and missiles. It has also been found that in an initial or delayed stage of the polymerization, other metals, such as finely divided aluminum, boron, beryllium, magnesium, etc., can be added to the polymerization mixture so as to give added thrust properties to the resultant polymer mass.

In a particularly advantageous modification of this process, the diene can be polymerized initially to a viscous stage in accordance with the practice of this invention and then a large proportion of the aforesaid oxidizing agents, together with or without additional finely divided metal, either of the type indicated above as suitable for catalyzing the polymerization or of the type indicated above to augment thrust properties of the resultant fuel, can be added. After thorough mixing of the added components in the viscous polymer mass, the resultant mixture is allowed to stand for final hardening into a casting without any substantial amount of settling out of the added solids.

While crosslinking of the polymer product can be obtained to a considerable degree from the conjugated diene itself, another modification of the invention facilitates crosslinking considerably by the addition of various polyalkenyl compounds, such as dialkenyl aryl compounds, non-conjugated aliphatic dienes, dialkenyl esters, dialkenyl ethers, and related compounds in which more than two alkenyl groups are present, such as tri- and tetra-alkenyl compounds. In such compounds, the alkenyl groups are advantageously terminal ethylenic groups, such as vinyl and alpha alkyl vinyl, although non-terminal ethylenic groups also have been found satisfactory.

The aforesaid crosslinking agents preferably are hydrocarbons when it is desirable to avoid decreasing the fuel value of the resultant compositions. However, when a crosslinking agent is used in small amounts, the presence of ester, or ether, or other groups in the crosslinking agents which will not interfere with the polymerization, is not too disadvantageous. Preferably there are no more than two ester, ether, or such other groups in such crosslinking compounds. Moreover, such crosslinking compounds advantageously have molecular weights no greater than about 300, preferably no greater than about 200. Generally, the crosslinking effect of such agents is noticeable with as little as 0.1 percent, but generally it is preferable to use at least one percent by weight based on the diene, and generally there is no particular advantage in exceeding 50 percent by weight.

The alkali metals which can be used to catalyze the polymerizations in accordance with the practice of this invention are lithium, sodium, potassium, cesium, and rhubidium, as well as alloys of two or more such metals, e.g. sodium-potassium alloy, etc. Derivatives of these metals containing only hydrocarbon and hydrogen also can be used, such as the alkyl, aralkyl, cycloalkyl, aryl, etc. derivatives, that is butyl lithium, butyl sodium, amyl potassium, benzyl sodium, phenylisopropyl potassium, triphenylmethyl sodium, amyl sodium, phenyl lithium, tolyl sodium, butyl cesium, butyl rhubidium, cyclohexyl sodium, propyl lithium, hexyl sodium, etc. While some of these hydrocarbon-metal compounds which can be used in the practice of this invention may not be reported in the literature they can all be prepared by the same methods using in preparing the more commonly known members of this class of compounds.

Generally it is preferred that a hydrocarbon group in such derivatives does not have more than approximately eight carbon atoms. The metal, or the metal derivative if it is a solid, advantageously is used in a very finely divided state to facilitate contact with the diene monomer and also to expose the metal to the diene more efficiently for catalytic effect. While even large particles will promote the reaction, the greater surface areas exposed by very finely divided particles increases the rate and the efficiency of reaction per unit weight of catalyst used.

Various methods of producing the metal in a finely divided state are well known. One method is to suspend the metal in a hydrocarbon having a boiling point above the boiling point of the metal, heating under a nitrogen or other inert atmosphere to a temperature above the melting point of the metal, effecting dispersion of the metal in the hydrocarbon by efficient agitation, and thereafter allowing the temperature to drop below the melting point of the metal while the agitation is continued, thereby producing finely divided solid particles of the metal. After cooling, most of the hydrocarbon can be decanted and the finely divided metal transferred to an appropriate reaction vessel. Xylene and toluene are particularly appropriate for producing finely divided sodium by this method. However, any method capable of producing the metal in finely divided state can be used for this purpose.

In the polymerizable compositions used in the practice of this invention, the catalytic effect is noted when there is as little as 0.1 percent of alkali metal present, based on the combined weight of conjugated diene and catalyst, regardless of whether the metal is in a metallic state or in a hydrocarbon-metal compound. Generally, however, it is advantageous to have at least one percent of the metal present, and since any excess metal will have fuel value in the ultimate use of the polymer product, there can be as much as 50 percent by weight of the metal, based on the combined weight of the metal or hydrocarbon-metal compound and conjugated diene. Where other metals, such as aluminum, boron, berryllium, magnesium, etc., also are added, the combined weight of the metals can be as high as 50 percent of the total weight of the conjugated diene and metals, including any metal compounds of the type indicated above.

The invention is illustrated best by the following examples which are intended merely to demonstrate various methods of practicing the invention and are not intended to limit in any way the scope of the invention. In these examples, and throughout the specification, parts and percentages, unless specifically indicated otherwise, are intended to be parts and percentages by weight.

*Example I*

A glass vial is swept out with oxygen-free nitrogen and maintained under a nitrogen atmosphere while cooled to approximately —30° C. To this vial are added the following materials, each of which has been precooled to approximately —30° C. to —20° C.: 10 parts of butadiene-1,3, one part of finely divided sodium, and five parts of finely divided potassium perchlorate. The vial then is sealed and placed on a rocking device where the vial and its contents are allowed to come to room temperature while the contents of the vial are agitated constantly by the rocking motion. The rocking is continued for a period of 48 hours, after which the vial is broken open. The polymerization product is found to be a completely solid mass having the potassium perchlorate distributed substantially uniformly throughout the mass. The ignition of this mass produces a steady burning with a brilliant white flame which is self-sustaining.

*Example II*

The procedure of Example I is repeated except that two parts of finely divided aluminum also are added to the polymerizable mass. Similar results are obtained.

*Example III*

The procedure of Example I is repeated four times using a different metal to catalyze the polymerization in each case, namely lithium, potassium, cesium, and rhubidium respectively. In each case a solid polymer is obtained as in Example I.

*Example IV*

The procedure of Example I is repeated a number of times using a different hydrocarbon-metal catalyst in each case, namely butyl-lithium, benzyl sodium, amyl potassium, phenyl cesium, hexyl rhubidium, and cyclohexyl sodium respectively. Similar results are obtained in each case.

*Example V*

The procedure of Example II is repeated three times using a different metal in place of the aluminum, namely boron, magnesium, and beryllium respectively. In each case a similar polymer product is obtained.

*Example VI*

A reaction flask equipped with a stirrer is swept out with oxygen-free nitrogen and maintained under a nitrogen atmosphere while 100 parts of isoprene and five parts of finely divided sodium are added. The mixture is agitated and allowed to react at ambient temperatures until the reaction product becomes very viscous. Then, 75 parts of finely divided potassium perchlorate are added gradually to the reaction product with continued stirring until the perchlorate is distributed substantially uniformly throughout the reaction mass. Then the mass is poured into a cylindrical container having a cylindrical wooden rod positioned at the axis of this cylindrical container, and having wrapped twice around the rod a single sheet of aluminum foil. The polymer mass then is allowed to stand for several days, at the end of which time the wooden rod is removed and the foil layer detached from the inner opening of the resultant cylindrical shape. The polymer product is found to be solidified completely with the potassium perchlorate substantially uniformly suspended in the solid polymer. Upon testing as a propellant grain in a rocket, this polymer product is found to have excellent ignition and propellant thrust properties.

*Example VII*

The procedure of Example VI is repeated using butadiene in place of the isoprene and using a pressure reactor to prevent escape of the butadiene by vaporization. A temperature of 50° C. is maintained. The desired stage of viscosity is determined by the load on the stirrer. Similar results are obtained.

*Example VIII*

The procedure of Example VII is repeated, except that 25 parts of finely divided aluminum also are added with the perchlorate to the viscous polymer product. The resultant solid mass has excellent burning and propellant thrust properties.

This procedure is repeated a number of times using finely divided boron, finely divided magnesium, and finely divided beryllium in different instances in place of the aluminum. It also is repeated a number of times using each time a different solid oxidizing agent, namely ammonium perchlorate, sodium perchlorate, ammonium nitrate, calcium perchlorate, cesium perchlorate, barium nitrate, ammonium nitrate, potassium chlorate, sodium iodate, potassium dichromate, ammonium dichromate, and lithium perchlorate respectively. In each case a product is obtained having excellent burning and propellant thrust properties.

*Example IX*

The procedure of Example VI is repeated except that prior to the addition of the potassium perchlorate, two parts of divinyl benzene are added to the viscous solution and thoroughly mixed therein, then an additional one part of finely divided sodium is added and mixed before the 75 parts of finely divided potassium perchlorate are added. The resultant mass when poured into the cylindrical container hardens more quickly and to a harder mass than does the product in Example VI.

Similar results are obtained when equivalent amounts of divinyl toluene, divinyl naphthalene, divinyl diphenyl, ethylene glycol dimethacrylate, divinyl ether of ethylene glycol, diallyl phthalate, divinyloxy benzene, and diallyl respectively, are substituted for the divinyl benzene.

*Example X*

The procedure of Example VII is repeated except that prior to the addition of the perchlorate, three parts by weight of divinyl benzene are added to the viscous polymer, and after thoroughly mixed therein, an additional two parts by weight of finely divided sodium is added and mixed before the perchlorate is added. When the resultant mass is poured into the cylindrical container and allowed to stand, solidification occurs more rapidly and to a harder mass than does the product in Example VII.

Similar results are obtained when equivalent amounts of divinyl toluene, divinyl naphthalene, divinyl diphenyl, diallyl benzene, diallyl, ethylene glycol diacrylate, and the diallyl ether of ethylene glycol respectively, are substituted for the divinyl benzene.

In carrying out the polymerization reactions, the temperatures can vary according to the particular ingredients, that is the relative reaction rate of the diene, the boiling point and vapor pressure of the diene, the activity of the various catalysts, and the type of equipment being used. Temperatures of —80° C. or even lower can be used. Generally, however, it is desirable to use a temperature of at least about room temperature to about 100°

C., and in some cases as high as about 150° C., particularly where high temperatures are desirable to complete the reaction or where the diene and catalyst are of relatively low activity. With dienes having high vapor pressure or low boiling points, such as butadiene-1,3, it is desirable to initiate the reaction at a temperature below room temperature, or to use a reaction vessel which can contain the resultant vapor pressure. Generally, however, a temperature in the range of room temperature to about 50° C. is advantageous. As previously indicated, it is sometimes desirable to complete the reaction by heating the reaction mass to a temperature of 50–100° C. toward the end of the polymerization. While higher pressures can be used without any disadvantage, generally it is not necessary to use pressures above those required to sustain the vapor pressure of the reagent.

Specific solid oxygen-containing compounds that can be used in the practice of this invention include lithium perchlorate, sodium perchlorate, potassium perchlorate, ammonium perchlorate, calcium perchlorate, cesium perchlorate, barium perchlorate, lithium nitrate, sodium nitrate, potassium nitrate, ammonium nitrate, calcium nitrate, cesium nitrate, barium nitrate, lithium chlorate, sodium chlorate, potassium chlorate, ammonium chlorate, calcium chlorate, cesium chlorate, barium chlorate, lithium iodate, sodium iodate, potassium iodate, ammonium iodate, calcium iodate, cesium iodate, barium iodate, lithium dichromate, sodium dichromate, potassium dichromate, ammonium dichromate, calcium dichromate, cesium dichromate, and barium dichromate.

Typical examples of crosslinking agents that can be used in the practice of this invention include: 1,4-pentadiene, hexadiene - 1,5, 2,4 - dimethyl-pentadiene-1,4, vinyl cyclohexene, divinyl cyclohexane, diallyl, 1,6-heptadiene, 1,8-nonadiene, 2,8-decadiene, 2,9-dimethyl-2,8-decadiene, divinyl cyclopentane, divinyl methyl cyclohexane, diallyl cyclohexane, diallyl cyclopentane, dibutenyl cyclohexane, dipentenyl cyclohexane, allyl cyclohexene, diallyl cyclohexene, divinyl cyclohexene, (beta-vinylalkyl)-furane, (beta-allyl-ethyl)-furane, 1,7 - diphenyl - heptadiene-1,6, 2,7-diphenyl-octadiene-1,7, divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl benzene, diallyl naphthalene, triallyl naphthalene, diallyl diphenyl, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl vinyloxy diphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl)-diphenyl, bis-(alpha-vinyl ethyl)-benzene, bis-(alpha-vinyl-ethyl)-naphthalene, bis-(alpha-vinyl-ethyl)-diphenyl, vinyl-(alpha-vinyl-ethyl)-benzene, vinyl-(alpha - vinyl - ethyl)-naphthalene, vinyl-(alpha-vinyl-ethyl)-diphenyl, dipropenyl benzene, p-propenyl styrene, para-propenyl benzene, diisopropenyl-benzene, dicrotyl benzene, dicrotyl naphthalene, dicrotyl diphenyl, dicrotyl anisole, dicrotyl xylene, bis-(4-vinyl-n-butyl)-benzene, bis-(5-isopropenyl - n - hexyl)-benzene, bis-(5-methyl-hepten-5-yl)-benzene, bis-(5-isopropenyl-n-hexyl)-diphenyl, bis-(methyl-nonene-6-yl)-diphenyl, bis-(n-decen-5-yl)-toluene, dicyclopentenyl-naphthalene, divinyl carbazole, di-cyclohexenyl-benzene, allene, acetylene, vinyl acetylene, divinyl acetylene, phenylene diacetylene, p-vinyl-phenyl acetylene, naphthylene, diacetylene, ethylene diacetylene, cyclohexylene diacetylene, n-hexen-5-yl-acetylene, b,b'-dimethyl phenylene-diacetylene,1-methyl - 2 - vinyl-acetylene, 1-methyl-2-isopropenyl-acetylene, 1 - methyl - 2 - propenyl-acetylene, divinyl ether, diallyl ether, vinyl allyl ether, propenyl-vinyl-ether, propenyl allyl ether, divinyl ether of resorcinol, divinyl ether of ethylene glycol, diisopropenyl ether, isopropenyl vinyl ether, isopropenyl allyl ether, isopropenyl butenyl ether, isopropenyl isoamylene ether, diallyl ether of resorcinol, diisobutenyl ether of hydroquinone, para-vinyloxy styrene, para allyloxy styrene, triallyloxy benzene, tripropenyloxy benzene, propargyl ethyl ether, dipropargyl ether, allyl acrylate, allyl methacrylate, vinyl acrylate, vinyl methacrylate, isopropenyl acrylate, isopropenyl methacrylate, butenyl acrylate, butenyl methacrylate, vinyl crotonate, allyl crotonate, isopropenyl crotonate, propenyl crotonate, isobutenyl crotonate, ethylene glycol diacrylate, trimethylene glycol diacrylate, tetramethylene glycol diacrylate, pentamethylene glycol dimethacrylate, divinyl phthalate, diallyl phthalate, diisopropenyl phthalate, dibutenyl phthalate, divinyl diphenyl-dicarboxylate, diallyl naphthalene-dicarboxylate, diallyl itaconate, divinyl itaconate, divinyl maleate, diallyl succinate, diisopropenyl succinate, dibutenyl succinate, divinyl succinate, diallyl adipate, divinyl adipate, diallyl azelate, divinyl azelate, diisopropenyl suberate, divinyl pimelate, diallyl glutarate, diisopropenyl glutarate, divinyl sebacate, diallyl sebacate, diallyl japanate, divinyl octadecanedioate, vinyl 11-acryloxy-undecanoate, allyl 11-methacryloxy undecanoate, isopropenyl 5-crotonoxy-caproate, vinyl 4-acryloxy-caproate, vinyl 11-vinyloxy-undecanoate, allyl 11-allyloxy-undecanoate, vinyl 11-allyloxy-undecanoate, isopropenyl 11 - isopropenyloxy-undecanoate, vinyl 5-vinyloxy-caproate, vinyl 5-crotyloxy-caproate, vinyl 5-allyloxy-caproate, allyl 5-allyloxy-caproate, isopropenyl 5 - isopropenyloxy - caproate, vinyloxy-tetramethylene acrylate, allyloxy-hexamethylene methacrylate, allyloxy-octamethylene crotonate, isopropenyloxy-octamethylene acrylate, crotyloxy - hexamethylene methacrylate, etc.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the followings claims.

The invention claimed is:

1. A polymerization process comprising the step of polymerizing a polymerizable mass consisting essentially of a conjugated diolefin, a polymerization catalyst selected from the class consisting of alkali metals and compounds thereof having only hydrocarbon substituent groups therein, said catalyst representing 0.1–50 percent by weight of the combined weight of said diolefin and said catalyst and 5–95 percent by weight of a solid oxygen-containing compound selected from the class consisting of the lithium, sodium, potassium, ammonium, calcium, cesium, and barium perchlorates, nitrates, chlorates, iodates, and dichromates.

2. A process of claim 1 in which at least one percent by weight of said polymerization catalyst is used.

3. A process of claim 2 in which said diolefin is butadiene-1,3.

4. A process of claim 3 in which said polymerization catalyst is sodium.

5. A process of claim 2 in which said diolefin is isoprene.

6. A process of claim 5 in which said polymerization catalyst is sodium.

7. A process of claim 1 in which said oxygen-containing compound is potassium perchlorate.

8. A process of claim 7 in which said diolefin is butadiene-1,3 and said polymerization catalyst is sodium.

9. A process of claim 1 in which said oxygen-containing compound is lithium perchlorate.

10. A process of claim 9 in which said diolefin is butadiene-1,3 and said polymerization catalyst is sodium.

11. A process of claim 1 in which said polymerizable mass also contains at least 1 percent by weight, based on combined weight of said diolefin, said catalyst, and said metal, of a finely divided metal selected from the class consisting of aluminum, boron, beryllium, and magnesium, the combined weight of said metal and the metal in said catalyst representing no more than about 50 percent by weight of the combined weight of said diolefin, said catalyst, and said metal.

12. A process of claim 11 in which said metal is aluminum.

13. A process of claim 11 in which said metal is boron.

14. A process of claim 11 in which said metal is beryllium.

15. A process of claim 11 in which said metal is magnesium.

16. A process of claim 1 in which said polymerizable mass in addition to said conjugated diolefin also contains 0.1–50 percent by weight of a polyunsaturated crosslinking agent selected from the class consisting of polyunsaturated hoydrocarbons, ethers and esthers having non-conjugated unsaturation therein.

17. A process of claim 16 in which said crosslinking agent is a hydrocarbon compound having a plurality of vinyl groups therein.

18. A process of claim 17 in which said crosslinking agent is an aromatic hydrocarbon having a plurality of vinyl groups therein.

19. A process of claim 16 in which said crosslinking agent is divinyl benzene.

20. A process of claim 16 in which said crosslinking agent is diallyl.

References Cited in the file of this patent
UNITED STATES PATENTS

| | | |
|---|---|---|
| 1,885,653 | Zutphen | Nov. 1, 1932 |
| 2,483,886 | Crouch | Oct. 4, 1949 |
| 2,797,208 | Burke | June 25, 1957 |
| 2,965,624 | Anderson | Dec. 20, 1960 |